United States Patent

La Tourrette et al.

[15] 3,641,458
[45] Feb. 8, 1972

[54] MODE SELECTIVE LASER WITH SMALL FEEDBACK REFLECTOR AND DIFFRACTION COUPLED OUTPUT

[72] Inventors: James T. La Tourrette, Huntington; Maurice C. Newstein, Syosset; Paul J. Rabinowitz, Plainview, all of N.Y.

[73] Assignee: Control Data Corporation, Minneapolis, Minn.

[22] Filed: Oct. 13, 1969

[21] Appl. No.: 866,165

Related U.S. Application Data

[63] Continuation of Ser. No. 386,619, July 31, 1964, abandoned.

[52] U.S. Cl. ...................................................331/94.5
[51] Int. Cl. ..........................................H01r 3/05
[58] Field of Search.....................................331/94.5

[56] References Cited

UNITED STATES PATENTS 3,136,959  6/1964  Culver..................................331/94.5
3,247,467  4/1966  Gensic et al. .........................331/94.5
3,344,365  9/1967  Lewis....................................331/94.5
3,055,257  9/1962  Boyd et al..............................331/94.5
3,187,270  6/1965  Kogelnik et al......................331/94.5
3,369,192  2/1968  Koester.................................331/94.5

Primary Examiner—William L. Sikes
Assistant Examiner—Edward S. Bauer
Attorney—Darby & Darby

[57] ABSTRACT

Laser apparatus is disclosed including a pair of reflectors for providing a regenerative feedback path through a laser working medium, one of the reflectors being substantially as large as the cross section of the working medium, and the other reflector being substantially smaller than the cross section of the working medium and sufficiently small to produce significant diffraction effects, the output of the apparatus being the portion of the laser beam not intercepted by the smaller reflector.

12 Claims, 4 Drawing Figures

INVENTORS
JAMES T. LaTOURRETTE
MAURICE C. NEWSTEIN
BY   PAUL J. RABINOWITZ

*Darby & Darby*
ATTORNEYS

MODE SELECTIVE LASER WITH SMALL FEEDBACK REFLECTOR AND DIFFRACTION COUPLED OUTPUT

This application is a continuation of prior copending application Ser. No. 386,619, filed July 31, 1964 and now abandoned.

The present invention relates to lasers which are adapted by simple and practical expedients to oscillate in selected modes and to be highly selective with respect to the directionality of the radiation transmitted from the laser.

The operation of laser oscillators is at the present time well known and will not be explained in detail. A principal advantage of lasers for generating electromagnetic radiation is their capability of generating a beam which is highly directional so that the extent to which the energy can be controlled, directed and concentrated exceeds that of any previously known devices.

A laser oscillator consists essentially of a laser medium which is capable of amplifying light (that is, radiation in the infrared, visible, or ultraviolet regions of the electromagnetic spectrum) by stimulated emission of radiation, and reflecting elements arranged to cause radiation so amplified to repetitively traverse the laser medium to provide regenerative amplification sufficient for oscillation.

One of the simplest and most common reflector systems for a laser consists of a pair of parallel plane reflectors, at least one of which is semitransparent. Such parallel reflectors characteristically have a size and shape corresponding substantially to the cross section of the laser medium in order to utilize a large portion of the volume of the laser medium and hence maximize the output available from the device. The size of these reflectors is very, very large compared to a wavelength of the radiation involved.

It is relatively easy to understand intuitively that the output from a laser with plane parallel reflectors has a preferential direction perpendicular to the surface of the reflectors, i.e., axially of the laser device. Radiation traversing the laser in other directions tends to "walk off" the reflector surfaces. However, experiments have found and theoretical analyses explain that there are other off-axis modes of oscillation for the plane parallel reflectors. The losses in the off-axis modes are relatively large but oscillations in such modes are nevertheless common when one attempts to increase the output of the laser by increasing the pumping or excitation level or otherwise increase the gain. According to well known principles of regenerative oscillation, the threshold for oscillation is reached when the gain for the regenerative cycle is barely greater than the losses.

It will be apparent to those versed in this art that many applications of lasers require that the electromagnetic radiation output will be as highly directional as possible and that common forms of reflector systems tend to generate outputs in other than an axial direction, thus failing to meet the desired condition.

Previous techniques have been used to restrict the oscillation of a laser to axial modes. A typical such technique has been the use of a pair of converging lenses placed within the reflector system and arranged to have a common focus for plane parallel axial beams propagating within the laser. At this common focus there is then placed a diaphragm with a pinhole (of approximately Fraunhofer spot size) arranged to accept the radiation in axial modes and block radiation in off-axial modes.

Such a pinhole mode selector has disadvantages in that it reduces total power output from the laser by virtue of the energy intercepted by the area of the diaphragm surrounding the pinhole. Furthermore the concentration of energy in the pinhole is exceedingly great and the energy at the edges of the diaphragm surrounding the pinhole tends to erode or destroy the diaphragm, particularly when high-pulse powers are involved. Other apparatus for mode selection has been suggested but in no case does it approach the simplicity and efficiency of the present invention.

According to the present invention mode selection is accomplished by the use of a reflector which is unusually small. Generally the second reflector in a two reflector system according to the invention will be of conventional size, i.e., about as large as the cross section of the laser medium. The small reflector and the other reflector will generally be completely opaque and the system is arranged so that at the plane of the small reflector the laser beam is substantially larger than the small reflector and the part of the beam which does not impinge upon the reflector constitutes the output of the system. The small reflector in the present system is, naturally, large compared to a wavelength of the radiation, but contrary to conventional systems, it is generally less than the geometric mean of the wavelength and the reflector separation.

It is an object of the present invention to provide a laser adapted to operate in selected modes to the exclusion of other modes which is of uncomplicated construction and adapted to provide high efficiency and high power.

It is another object of the present invention to provide a laser with a reflector system that selects as the output from the system energy which in a conventional laser reflector system would represent the diffraction loss of the system.

It is another object of the present invention to provide a laser reflector system with mode selection properties which does not require concentrations of energy at reflection or transmission surfaces which are in excess of the energy concentration in the output beam.

Other objects and advantages will be apparent from the following description taken in conjunction with the appended drawings, in which.

Figure 1:
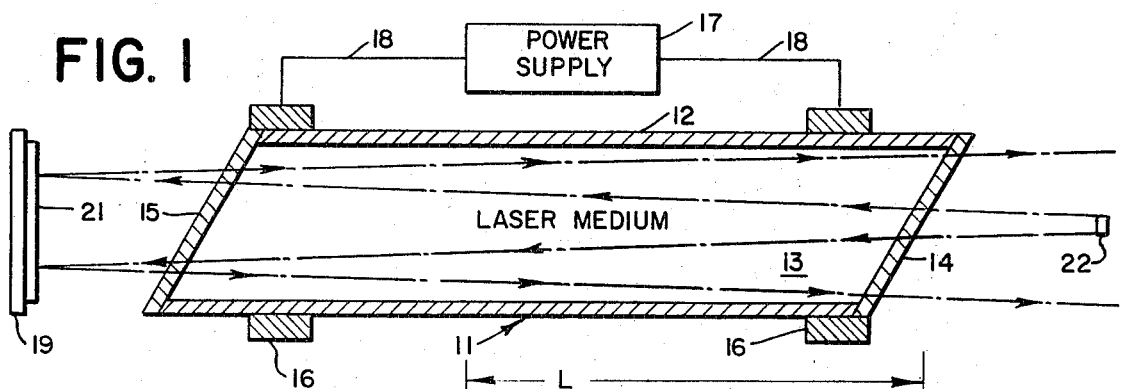
FIG. 1 is a partially schematic sectional view of laser apparatus according to the present invention.

Referring now to FIG. 1, laser apparatus 11 is shown which, for the purpose of illustration, is of the gaseous, radiofrequency-energized type.

An enclosure 12 is provided for the laser medium which enclosure includes windows 14 and 15 oriented at Brewster's angle to minimize transmission losses in windows 14 and 15 according to frequent practice in the art.

Electrodes 16 surround enclosures 12 and are energized from a power supply 17 through electrical leads 18. A radio frequency discharge is thereby created in the laser medium, which may conveniently be a helium-neon mixture (which oscillates at a wavelength of 3.39 microns).

The reflector system for the laser 11 comprises reflecting surfaces 21 and 22. Reflector 21 may comprise an aluminized or silver layer deposited upon an optically flat substrate 19 or alternatively may comprise a multilayer interference reflector with high (approximately 99 percent) reflectivity at the wavelength of operation of the apparatus.

Reflector 22 is small compared to reflector 21 and to the limiting aperture of the laser system, which in the case of FIG. 1 is the laser enclosure 12. To facilitate explanation it will be considered in FIG. 1 that both reflector 21 and 22 are flat and are respectively parallel. Reflector 22 may be formed in the same manner as reflector 21 or may alternatively be a highly polished solid metal (e.g., silver or gold) reflector.

The manner in which the reflector 22 is supported has not been illustrated but it is apparent that it could be supported by a spider structure which would obscure the output path of the laser to an insignificant extent, or the reflector 22 could alternatively be supported on the Brewster angle window 14 on either the outside or the inside or on a further Brewster angle window provided for the express purpose of supporting reflector 22. Still further means for supporting the reflector 22 will be mentioned in the discussion of other embodiments of the invention.

The operation of the apparatus of FIG. 1 will now be explained. In an operative example of apparatus such as illustrated in FIG. 1 the laser medium enclosure 12 has an inside diameter of 7 millimeters and the length of the enclosure is 35 centimeters. The spacing between reflectors is 60 centimeters and the diameter of the small reflector is 1 millimeter.

It is known that increasing the ratio of the length between reflectors to the diameter of the reflectors enhances the mode selecting properties of a laser system. In fact this property has been utilized in so-called distant mirror laser reflector arrangements whereby the ratio of length between reflectors to reflector diameter was increased by placing one reflector at a considerable distance.

Reducing the size of the reflectors to increase the aforesaid factor had not, prior to the present invention, appeared to be practical. Decreasing the size of the reflectors in the conventional reflector systems with output through one partly transparent reflector resulted in an increase in diffraction losses. That is, light was lost around the edges of the reflectors. There was also a decrease in the effective volume of the laser medium and hence the power that could be generated. Accordingly reduction of reflector sizes would not appear to lead to an increase in the power which could be generated in a single mode.

In the apparatus of FIG. 1 according to the present invention one of the reflectors, namely reflector 22, is made so small that the diffraction pattern of the aperture represented by this small reflector illuminates an area many times greater than that of the small reflector 22. In the apparatus of FIG. 1 the area of reflector 21 illuminated by this diffraction pattern has a diameter approximately one-half the diameter of the enclosure 12 which represents the limiting aperture of the system. Accordingly the beam reflected from reflector 21 diverges to substantially fill the enclosure 12 adjacent the window 14.

A large proportion of the energy emerging from window 14 fails to strike reflector 22 (in FIG. 1 approximately 90 percent). But according to the invention this radiation constitutes the output from the laser system. This output is selectively caused to have a particular direction of propagation, or in other words to propagate in selected modes. The modes of propagation are axial if the reflectors are substantially parallel.

In the apparatus of FIG. 1 the beam output is slightly diverging but it can readily be collimated by an appropriate lens or reflector. According to well known optical principles the minimum beam divergence which can be achieved depends upon the aperture of the output lens or reflector which is utilized. The fact that a small central area of the output beam is obscured by reflector 22 does not significantly detract from the directivity of the laser output beam. This may be understood by analogizing the situation to that of astronomical reflecting telescopes where it has long been known that obscuring a small central area of the aperture does not seriously affect the resolving power of the telescope.

While, generally, axial modes will be selected in apparatus according to the invention, selected off-axis modes would be preferentially generated if the reflectors were appropriately tilted with respect to each other.

It will be apparent from the explanation of the apparatus of FIG. 1 that such apparatus is best suited for use with a laser medium which has a fairly high gain. It is well known that in order to sustain oscillation, the total gain in the regeneration cycle must slightly exceed the total loss. The fact that reflector 22 is of rather small area compared to the cross-sectional area of the beam in the plane of reflector 22 means that the "loss" is high and on the order of 90 percent in the specific example given. Accordingly the total gain in two passes through the laser medium 13 should equal or exceed a factor 10 for which a single pass gain of somewhat more than 3 is required. Fortunately this is readily achievable in various laser media for example, helium-neon, ruby, etc. Furthermore future research on laser media is virtually certain to develop additional high-gain media. Obviously insufficient gain in a particular laser medium can be offset to some extent by lengthening the laser medium volume, subject to practical limitations.

From the foregoing explanation it will be appreciated that the present invention provides, by a novel approach, a mode discriminating laser reflector system which is remarkably simple and efficient and at the same time capable of handling high-intensity radiation.

Figure 2:
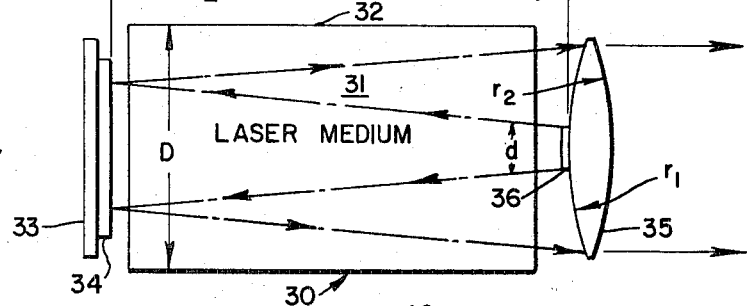
FIG. 2 is a schematic illustration of an alternative form of laser apparatus according to the present invention employing a convex small reflector.

One of numerous variations of the general concept of the invention is illustrated schematically in FIG. 2. Numerous conventional features of the system have been omitted for simplicity in FIG. 2, for example the power supply and details of the enclosure including Brewster windows, etc. These and other features will of course be incorporated in laser systems according to the present invention in accordance with the knowledge and skill of the art. It should be noted that the laser medium is indicated only generally in FIG. 2 and it should be pointed out that solid or liquid laser media could just as readily be utilized as gaseous media within the scope of this invention.

The specific apparatus illustrated in FIG. 2 departs from the previously explained apparatus in that curved reflecting and refracting surfaces are employed.

Laser apparatus 30 comprises an enclosure 32 for a laser medium 31 (of course in the case of solid media such as ruby no enclosure as such is required). A reflecting surface 34 is supported on substrate 33 and a second reflecting surface 36 is deposited on a double-convex lens 35 which may be of quartz to reduce transmission loss.

The reflector 36 has the same curvature as the base of lens 35 upon which it is supported and is thus a convex reflector. As will later be explained in more detail the reflector 36 may by virtue of its convexity be larger in proportion to the limiting aperture of the system represented by laser medium 31 or lens 35.

Making the reflector 36 of a larger diameter relative to the system aperture diameter has the advantage of returning a larger proportion of the energy in a feedback path so that it is unnecessary to provide as high a gain in the system as would otherwise be the case. To put this in other words, the "losses" which must be overcome to sustain oscillation are reduced thus reducing the gain requirement.

There is also a disadvantage associated with enlarging the size of reflector 36; enlargement of the size of this reflector places greater requirements upon accuracy of alignment of reflector 36 with respect to reflector 34. An erstwhile unemphasized advantage of the apparatus of FIG. 1 is the fact that the alignment of reflectors 21 and 22 is much less critical than in the case of the usual large equal-sized plane parallel reflectors of a conventional Fabry-Perot laser (because of the smaller Fresnel number). In a typical case the alignment tolerance for reflector 22 would be several minutes of arc which is quite easily achieved.

It will also be noted in FIG. 2 that the lens 35 may also be utilized either to collimate or to focus the output beam from the laser system which would otherwise be diverging. The focal length of the lens 35 can be adjusted independently of the radius of curvature $r_1$ or reflector 36 by varying the radius of curvature $r_2$ of the outside surface of the lens.

It will be particularly noted with respect to the apparatus of FIG. 2, and the same situation may exist with respect to other embodiments of the invention, that the support for the small reflector may be the source of spurious, i.e., unwanted, reflections. In the apparatus of FIG. 2, these reflections may be minimized by providing an antireflection coating on the lens 35 surrounding the reflector 36. It may also be desirable to arrange the thickness of reflector 36 and of the coating on lens 35 so that the small amount of reflected energy from around the reflector 36 is in phase with the energy reflected from reflector 36. In this fashion destructive interference in the feedback path will be eliminated and the only undesirable effect of the spurious reflections would be a slight decrease in the mode selecting properties of the reflector system.

In the apparatus of FIG. 2 the problem of spurious reflections is also reduced by the convexity of the surface supporting reflector 36 since spurious reflections are thereby caused to diverge and largely fail to impinge on reflector 34. As will be apparent from descriptions of other modifications of the apparatus, elimination of spurious reflections can be accomplished in various ways where they represent a significant problem.

It is pertinent at this point to briefly survey the manner in which reflectors and/or lenses of different curvatures can be employed in variations of apparatus according to the present invention. As seen in FIGS. 1 and 2 the "small" reflector can be either flat or convex. It can also be concave as will be seen in FIG. 4.

Figure 4:
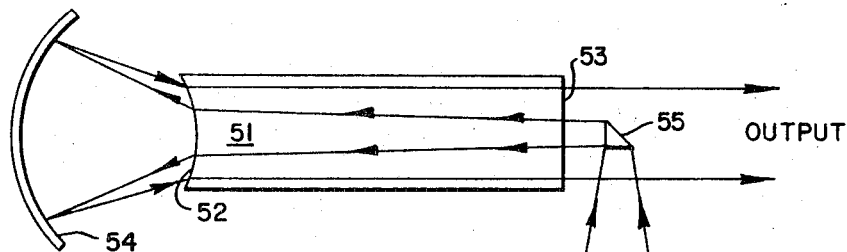
FIG. 4 is a schematic illustration of a still further alternative form of laser apparatus according to the present invention, incorporating provisions for generating large pulses by a Q-switching technique.

It will also be seen in FIG. 4 that the "small" reflector may be replaced by what is in effect a small hole with a not so small reflector behind it.

Instead of being flat as illustrated in FIGS. 1 and 2 the large reflector can be concave which is a particularly convenient way of producing a collimated output without the intervention of further converging optical elements. The use of a concave large reflector will also readily permit the emerging beam to be converging which will of course be desirable for certain applications. The large reflector may of course also be convex but the advantages of this configuration appear to be of limited application.

Returning momentarily to the configuration of FIG. 1 utilizing flat reflectors it has been pointed out that the optimum configuration for mode selection is generally that in which the diffraction pattern from the small reflector 22 just fills the full laser aperture which is represented by the enclosure 12 in FIG. 1. Utilizing the dimensional references of FIG. 2 the dimensions of the system using plane reflectors throughout may conveniently be set at $d=2L\lambda/D$.

On the other hand where a convex small reflector is used as in FIG. 2 the values may conveniently be set at $r_1=(2dL)/(D-d)$; $R_2$ can readily be calculated to provide the proper lens focal length to collimate the output beam if such is desired.

Figure 3:
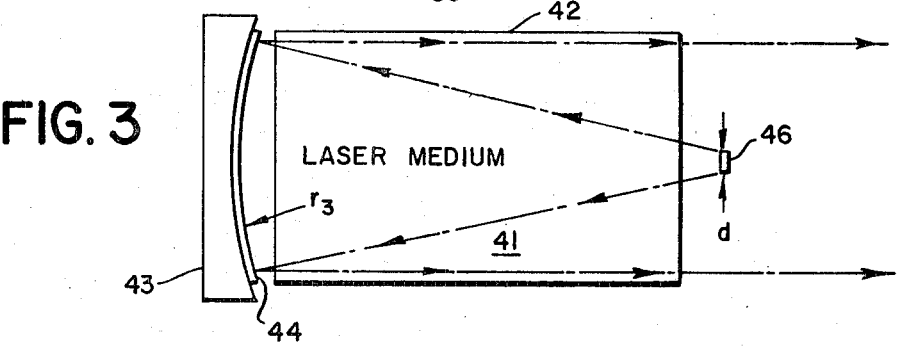
FIG. 3 is a schematic illustration of a further alternative form of laser apparatus according to the present invention employing a concave large reflector.

A concave large reflector is illustrated in FIG. 3 in which the laser medium 41 is contained in an enclosure 42 and the large concave reflecting surface 44 is supported on a substrate 43. The small reflector 36 is illustrated as being flat but it may of course alternatively be concave or convex.

In apparatus with a curved concave large reflector such as FIG. 3, $r_3$ may be approximately $2L$ and if $r_1=\infty$, $d=\lambda r_3/D$. Alternatively the concave reflector of FIG. 3 may be employed with the convex small reflector of FIG. 2 with dimensions, for example, of $r_3=2(L+R_1)$, $d=0.1D$ and $d/r_1=D/(r_1+L)$; $r_1=dL/(D-db0)$. In this example to collimate the output $r_2=-r_1$.

FIG. 4 illustrates the manner in which apparatus according to the present invention is readily adapted to include a Q-switch for producing rapid intense output pulses. In FIG. 4 a laser medium 51 is illustrated which may be ruby or other solid state material. One face 52 of the laser material is ground to a concave surface to provide a diverging lens. The other face 53 is illustrated as flat.

The particular optics illustrated in FIG. 4 is of course merely exemplary and further or different optical elements may be substituted in accordance with the knowledge of the art. For example, Brewster angle transmission surfaces have not been shown though they may be desired. A concave large reflector 54 is provided which has a curvature, which, associated with the diverging power of face 52, acts to collimate the output beam from face 53 in accordance with known optical design techniques and the previous description.

A small angled reflector, in the form a prism 55 for example, is disposed in place of the "small" reflector of previous systems.

Interposed in the beam deflected by prism 55 is a Q-switch apparatus 57. The Q-switch may be any one of many known forms and may comprise, for example, a Kerr cell, a bleachable saturable absorber, a rotating prism, a Pockels cell, or an electrically controlled variable refraction prism of KTN, for example.

The beam diverted by reflector 55 is returned back through Q-switch 57 to reflector 55 by a converging reflector 56. The subsequent path of the beam is back through the laser medium 51 to the concave reflector 54 and thence through the surface 52 into the laser medium 51, at which point the beam is collimated by the combined action of reflector 54 and diverging lens surface 52. Hence the output of the apparatus emerges in a collimated beam.

The apparatus of FIG. 4 has many advantages over previous Q-switched laser apparatus.

The apparatus of FIG. 4 places the Q-switch 57 only in the feedback path for the laser oscillator and not in the final output. The feedback path may contain as little as 2 percent or less of the total power in the output of the device and thus relatively high losses in the Q-switch can be tolerated without seriously deteriorating the overall efficiency of the device. Losses in the Q-switch would have to be made up by increases in gain in the laser medium but this presents relatively little difficulty. The particular form of apparatus of FIG. 4 also has the advantage that the Q-switch 57 and reflectors 54 and 56 are placed at points in the optical path where the intensity is low. Only the element 55 is subjected to the higher intensity of the output beam, and the element 55 may constitute a total internal reflection type of reflector with practically no absorption or be otherwise designed so that it is able to withstand high intensities.

It should be mentioned that in the apparatus of FIG. 4, or in other previously described embodiments, the output of the apparatus may be diverted by a reflecting surface oriented at about 45° in which is placed a small preferably elliptical, hole defining the aperture of the "small reflector." The "small reflector" may then be placed behind the small hole providing essentially the same mode of operation as previously described, but in a slightly different configuration.

In addition to the variations of the invention suggested and described, numerous other variations will be apparent to those skilled in the art. It is accordingly intended that the scope of the invention not be limited to those specific embodiments suggested or illustrated, but rather that it be defined by reference to the appended claims.

We claim:

1. A laser generator comprising a laser working medium within an optical resonator having an optical axis, said resonator including first and second substantially opaque reflectors, said second reflector being in a plane transverse to said optical axis, said second reflector having a geometry such that the aperture represented by said second reflector produces a diffraction pattern which illuminates an area on said first reflector which is substantially larger than said second reflector, said first reflector being located with respect to said working medium and said second reflector so that the diffraction pattern is reflected from the first reflector through said working medium and said plane substantially without obstruction except for said second reflector, whereby a coherent output beam is emitted by said laser generator constituted by the portion of said diffraction pattern not reflected by said second reflector.

2. Apparatus as claimed in claim 1 wherein said second reflector is located obliquely with respect to said optical axis to separate the retraversing portion of said laser light from said output portion and direct these two portions in different directions.

3. A laser generator comprising a laser working medium within an optical resonator having an optical axis, said resonator including first and second substantially opaque reflectors, each said reflector being in a plane perpendicular to said optical axis, said second reflector having a geometry such that the aperture represented by said second reflector produces a diffraction pattern which illuminates an area on said first reflector which is substantially larger than said second reflector, said first reflector being located with respect to said working medium and said second reflector so that the diffraction pattern is reflected from the first reflector through said working medium and the plane of said second reflector substantially without obstruction except for said second reflector, whereby a coherent output beam is emitted by said laser generator constituted by the portion of said diffraction pattern not reflected by said second reflector.

4. Apparatus as claimed in claim 3 wherein said first and second opaque reflectors are of different size with the larger reflector being plane and at least as large as the diffraction pattern projected thereon by the smaller reflector and the smaller reflector is convex.

5. Apparatus as claimed in claim 3 wherein said opaque reflectors are of different size with the larger reflector being concave and at least as large as the diffraction pattern projected thereon by the smaller reflector.

6. A laser generator comprising a laser working medium within an optical resonator having an optical axis, said resonator including first and second substantially opaque reflectors, said second reflector being convex and in a plane perpendicular to said optical axis, said second reflector having a geometry such that the aperture represented by said second reflector produces a diffraction pattern which illuminates an area on said first reflector which is substantially larger than said second reflector, said first reflector being located with respect to said working medium and said second reflector so that the diffraction pattern is reflected from the first reflector through said working medium and said plane substantially without obstruction except for said second reflector, whereby a coherent output beam is emitted by said laser generator constituted by the portion of said diffraction pattern not reflected by said second reflector.

7. A laser generator comprising a laser working medium within an optical resonator having an optical axis, said resonator including first and second substantially opaque reflectors, said second reflector being in a plane perpendicular to said optical axis, said second reflector having a geometry such that the aperture represented by said second reflector produces a diffraction pattern which illuminates an area on said first reflector which is substantially larger than said second reflector, said first reflector being concave and located with respect to said working medium and said second reflector so that the diffraction pattern is reflected from the first reflector through said working medium and said plane substantially without obstruction except for said second reflector, whereby a coherent output beam is emitted by said laser generator constituted by the portion of said diffraction pattern not reflected by said second reflector.

8. A laser generator comprising a laser working medium within an optical resonator having an optical axis, said resonator including first and second substantially opaque plane reflectors, said second reflector being in a plane perpendicular to said optical axis, said second reflector having a geometry such that the aperture represented by said second reflector produces a diffraction pattern which illuminates an area on said first reflector which is substantially larger than said second reflector, said first reflector being located with respect to said working medium and said second reflector so that the diffraction pattern is reflected from the first reflector through said working medium and said plane substantially without obstruction except for said second reflector, whereby a coherent output beam is emitted by said laser generator constituted by the portion of said diffraction pattern not reflected by said second reflector.

9. A laser generator comprising a laser working medium within an optical resonator having an optical axis, said resonator including first and second substantially opaque reflectors, said second reflector being in a plane transverse to said optical axis, said second reflector having a dimension less than the geometric mean of the laser operating wavelength and the reflector separation and having a geometry such that the aperture represented by said second reflector produces a diffraction pattern which illuminates an area on said first reflector which is substantially larger than said second reflector, said first reflector being located with respect to said working medium and said second reflector so that the diffraction pattern is reflected from the first reflector through said working medium and said plane substantially without obstruction except for said second reflector, whereby a coherent output beam is emitted by said laser generator constituted by the portion of said diffraction pattern not reflected by said second reflector.

10. Apparatus as claimed in claim 9 wherein said first and second opaque reflectors are of different size with the larger reflector being plane and at least as large as the diffraction pattern projected thereon by the smaller reflector and the smaller reflector is convex.

11. Apparatus as claimed in claim 9 wherein said opaque reflectors are of different size with the larger reflector being concave and at least as large as the diffraction pattern projected thereon by the smaller reflector.

12. Apparatus as claimed in claim 9 wherein said second reflector is located obliquely with respect to said optical axis to separate the retraversing portion of said laser light from said output beam portion and direct these two portions in different directions.

* * * * *